United States Patent
Frechard et al.

(10) Patent No.: US 12,472,583 B2
(45) Date of Patent: Nov. 18, 2025

(54) SYSTEM AND METHOD FOR ADDING MATERIAL TO A DETERMINED SURFACE OF A WORKPIECE BY MEANS OF A LASER BEAM DIRECTED BY A LASER SCANNING HEAD AND LATERAL POWDER INJECTION

(71) Applicants: BEAM, Strasbourg (FR); IREPA LASER, Illkirch Graffenstaden (FR)

(72) Inventors: Jonathan Frechard, Illkirch Graffenstaden (FR); Frederique Machi, Ostwald (FR); Thierry Engel, Strasbourg (FR)

(73) Assignees: ADDUP, Cebazat (FR); IREPA LASER, Illkrich Graffenstaden (FR)

( * ) Notice: Subject to any disclaimer, the term of this patent is extended or adjusted under 35 U.S.C. 154(b) by 858 days.

(21) Appl. No.: 17/620,422

(22) PCT Filed: May 25, 2020

(86) PCT No.: PCT/FR2020/050863
§ 371 (c)(1),
(2) Date: Dec. 17, 2021

(87) PCT Pub. No.: WO2020/254737
PCT Pub. Date: Dec. 24, 2020

(65) Prior Publication Data
US 2022/0347750 A1 Nov. 3, 2022

(30) Foreign Application Priority Data
Jun. 17, 2019 (FR) .................................. 1906482

(51) Int. Cl.
B23K 26/342 (2014.01)
B22F 10/25 (2021.01)
(Continued)

(52) U.S. Cl.
CPC ............ *B23K 26/342* (2015.10); *B22F 10/28* (2021.01); *B22F 10/368* (2021.01);
(Continued)

(58) Field of Classification Search
CPC ................ B23K 26/342; B23K 26/034; B23K 26/0626; B23K 26/0665; B23K 26/144;
(Continued)

(56) References Cited

U.S. PATENT DOCUMENTS 6,459,951 B1 * 10/2002 Griffith ................ B23K 26/032
700/118
6,605,795 B1 * 8/2003 Arcella ................... B22F 10/25
219/121.65
(Continued)

FOREIGN PATENT DOCUMENTS

CN 103407296 A 11/2013
CN 106061716 A 10/2016
(Continued)

OTHER PUBLICATIONS

J. Pekkarinen, "Scanning optics enabled possibilities and challenges in laser cladding", Physics Procedia 78 (2015) 285-295.
(Continued)

*Primary Examiner* — Robert G Bachner
(74) *Attorney, Agent, or Firm* — Venable LLP (57) ABSTRACT

Disclosed is a system for adding material by melting powder on a determined surface of a workpiece by means of a laser beam in order to construct a volume, the system comprising: —a laser beam emitting device, —a laser scanning head provided with at least two galvanometric mirrors and provided with a lens for focusing the reflected incident laser beam on the determined surface, the system comprising the laser scanning head being held stationary relative to the workpiece while the volume is constructed, —a powder (Continued)

injection device positioned laterally relative to the focused reflected incident laser beam in order to distribute the powder on the determined surface, —the powder is melted by the focused reflected incident laser beam emitted on the powder distributed on the determined surface.

22 Claims, 6 Drawing Sheets

(51) Int. Cl.

| | |
|---|---|
| *B22F 10/28* | (2021.01) |
| *B22F 10/368* | (2021.01) |
| *B22F 12/00* | (2021.01) |
| *B22F 12/41* | (2021.01) |
| *B22F 12/49* | (2021.01) |
| *B22F 12/53* | (2021.01) |
| *B22F 12/90* | (2021.01) |
| *B23K 26/03* | (2006.01) |
| *B23K 26/06* | (2014.01) |
| *B33Y 10/00* | (2015.01) |
| *B33Y 30/00* | (2015.01) |
| *B33Y 50/00* | (2015.01) |

(52) U.S. Cl.
CPC ............ *B22F 12/222* (2021.01); *B22F 12/41* (2021.01); *B22F 12/49* (2021.01); *B23K 26/034* (2013.01); *B23K 26/0626* (2013.01); *B23K 26/0665* (2013.01); *B33Y 10/00* (2014.12); *B33Y 30/00* (2014.12); *B33Y 50/00* (2014.12); *B22F 10/25* (2021.01); *B22F 12/226* (2021.01); *B22F 12/53* (2021.01); *B22F 12/90* (2021.01)

(58) Field of Classification Search
CPC ..... B23K 26/354; B23K 26/702; B22F 10/28; B22F 10/368; B22F 12/222; B22F 12/41; B22F 12/49; B22F 10/25; B22F 12/226; B22F 12/53; B22F 12/90; B22F 2007/068; B22F 10/64; B33Y 10/00; B33Y 30/00; B33Y 50/00; B33Y 50/02; G05B 19/4099; Y02P 10/25
See application file for complete search history.

(56) References Cited

U.S. PATENT DOCUMENTS

| | | | |
|---|---|---|---|
| 7,045,738 B1 | 5/2006 | Kovacevic et al. | |
| 2016/0311027 A1* | 10/2016 | Shimoyama | B29C 64/188 |
| 2019/0381566 A1 | 12/2019 | De Chirico | |
| 2021/0308771 A1 | 10/2021 | Frechard et al. | |

FOREIGN PATENT DOCUMENTS

| | | |
|---|---|---|
| CN | 106148947 A | 11/2016 |
| WO | 2018/069809 A1 | 4/2018 |

OTHER PUBLICATIONS

International Search Report dated Sep. 17, 2020, in corresponding PCT/FR2020/050863 (6 pages).

* cited by examiner

SYSTEM AND METHOD FOR ADDING MATERIAL TO A DETERMINED SURFACE OF A WORKPIECE BY MEANS OF A LASER BEAM DIRECTED BY A LASER SCANNING HEAD AND LATERAL POWDER INJECTION

FIELD OF THE INVENTION

The present invention relates to the field of resurfacing, construction and repair and more specifically to a system and method for adding material to a determined surface of a part by means of a laser beam.

STATE OF THE ART

Nowadays, resurfacing, construction and repair are considered as an industrial production technology. As such, additive construction or manufacturing is used in many industrial sectors such as aeronautics or the medical field, which are demanding fields. Therefore, it is necessary to produce parts of high quality for the final customer.

In prior art, the method of deposition of material under concentrated energy is based on the principle of depositing metal powders in a molten state onto a solid substrate.

Indeed, the initial principle consists in using a tool to send metal powder in solid form, with a defined particle size, typically in the order of 45 to 90 µm, into a power beam such as a laser beam or an electron beam. As the powder passes through the laser beam, it is heated and melted and metallurgically bonds to the substrate to form a deposit. As the tool moves, it is possible to create metal beads on the substrate. The layers are then superimposed to create volume parts. The metal powder is the basis of all construction using LMD (Laser Metal Deposition) technology.

The powder, with a very fine particle size, is sent in the form of a jet comprised of a transport gas (called carrier gas) and metal powder particles. This jet enables the powder to be carried to the laser beam. The gas flow rate is expressed in litres/minutes and the powder flow rate in grammes/minutes.

The powder stream comes from a powder dispenser and travels through a tube to the depositing tool, as close as possible to the laser beam, in which it is injected. The mechanical element through which the powder jet exits is called a nozzle. The metal powder is deposited onto the substrate, a few millimetres away from the nozzle. The role of the nozzle is to guide the powder jet, including the carrier gas, in a controlled manner so that the powder jet reaches the laser beam in an optimal manner. The nozzle is comprised of several mechanical parts, including concentric cones, the purpose of which is to guide the powder. Powder jet guidance depends on two cones: the external cone and the intermediate cone. Thus, the nozzle is adapted to guide the powder jet and contains in its centre a laser beam adapted to heat the powder.

The powder is thus directed into the laser beam by an annular cone-shaped jet. The powder jet is sort of "focused" into the laser beam, which is at the centre of this conical jet. Thus, the powder jet and the laser beam are fed in parallel directions.

However, the presence of the nozzle creates an overall size problem for accessing relatively narrow zones when performing a resurfacing, repair or manufacturing method.

In addition, with system according to prior art, some materials crack under the effect of heat of the laser beam. This is because the supply of energy by means of a slow-acting laser beam, that is less than 5 metres per minute, causes these materials to crack.

In prior art, some DED (Directed Energy Deposition) systems use a scanning LASER head to artificially magnify the beam. Indeed in order to increase size of the deposits, the beam is moved very quickly and the deposit trajectory is made by moving the scanning head. Difficulties related to cracking and overall size are not solved by this type of system, which is disclosed in Pekkarinen document [1].

It is therefore necessary to provide a system and method that overcome the above mentioned drawbacks.

SUMMARY OF THE INVENTION

According to a first aspect, the object of the invention relates to a system for adding material by melting powder onto a determined surface of a part by means of a laser beam to construct a volume, said system comprising:
- a laser beam emitting device to emit an incident laser beam,
- a laser scanning head provided with at least two galvanometric mirrors to reflect and move the incident laser beam at least in the plane of the surfaces to be resurfaced, repaired or constructed according to a determined pattern, and provided with a lens for focusing the reflected incident laser beam onto the determined surface, the system comprising the laser scanning head being held stationary with respect to the part upon constructing said volume,
- a powder injection device positioned laterally relative to the reflected incident laser beam focused to dispense powder onto the determined surface, the powder being continuously dispensed during the construction of said volume, melting the powder being carried out by the reflected incident laser beam focused emitted onto the powder dispensed onto the determined surface.

Preferably, the system comprises at least one polyarticulated support for moving the system and/or the part for positioning the system relative to the part in order to access the determined surface.

Preferably, the powder injection device comprises a tube for dispensing powder onto the determined surface.

Preferably, the powder injection device comprises a first adjustment device to laterally adjust the tube in a plane parallel to the determined surface of the part.

Preferably, the powder injection device comprises a second adjustment device to adjust angle from which the powder is dispensed onto the determined surface.

Preferably, the powder injection device comprises a third adjustment device to adjust height of the tube relative to the determined surface.

Preferably, the powder injection device comprises a fourth adjustment device to adjust height of the powder injection device relative to the surface of the part.

Preferably, the system comprises a lighting device to light the determined surface.

Preferably, the system comprises a camera for locating the pattern and positioning the system.

Preferably, the system comprises a device for analysing the volume of material to be added, such as a probe, a three-dimensional scanner or a camera.

Preferably, the system comprises an adaptive programming unit to create trajectories adapted to the volume of material to be added.

Preferably, the system comprises a unit for acquiring temperature of the part during a pre-heating step before addition of material and during a post-heating step after addition of material.

Preferably, the system comprises a unit for automatically initiating addition of material at a given temperature.

Preferably, the system comprises a unit for automatically managing a complete cycle of addition of material.

Preferably, the system comprises an information analysis unit for monitoring addition of material.

Preferably, the system comprises a unit for analysing geometry of the volume constructed and a unit for comparing it with a three-dimensional model.

Preferably, the system comprises a unit for automatically managing arrival of powder.

Preferably, the system comprises a unit for feedback controlling the emission power of the laser beam as a function of temperature.

According to a second aspect, the object of the invention relates to a method for adding material to a determined surface of a part by means of a laser scanning head, a laser beam emission device and a powder injection device, the laser scanning head being provided with two galvanometric mirrors to reflect and focus an incident laser beam, and move the reflected incident laser beam focused on the determined surface in a determined pattern, upon rotating the galvanometric mirrors and the laser scanning head, the laser beam emitting device, and the powder injection device being stationary relative to the part, said method comprising the following steps of:
 identifying the surface to be resurfaced, constructed or repaired on the part,
 relatively positioning the laser scanning head, the laser beam emitting device, and the powder injection device and/or the part,
 activating the powder injection device for flowing powder onto the determined surface identified,
 emitting the reflected incident laser beam focused on the determined surface identified according to a predefined pattern,
 melting the powder on the determined surface identified simultaneously with emitting the reflected incident laser beam focused.

Preferably, the method comprises a pre-heating step, in which the reflected incident laser beam focused is emitted onto the determined surface identified according to a predefined pattern, the pre-heating step taking place before the step of activating the powder injection device.

Preferably, the method comprises a post-heating step, the post-heating step taking place after the step of deactivating the powder injection device.

BRIEF DESCRIPTION OF THE DRAWINGS

The purposes, objects and characteristics of the invention will become clearer upon reading the following description made with reference to the drawings in which.

DETAILED DESCRIPTION OF ONE EMBODIMENT

The present invention relates to the method of additive manufacturing, that is of resurfacing, repair or construction, which consists especially in constructing an element on a substrate or on a part, layer after layer, by melting metal powders injected laterally relative to the emission of a laser beam. The element or volume to be constructed is made up of n layers. Each layer is scanned by the laser beam in a specific manner which may be different depending on the layers.

The present invention also relates to the method of repairing a part and the method of resurfacing a part.

Figure 1:
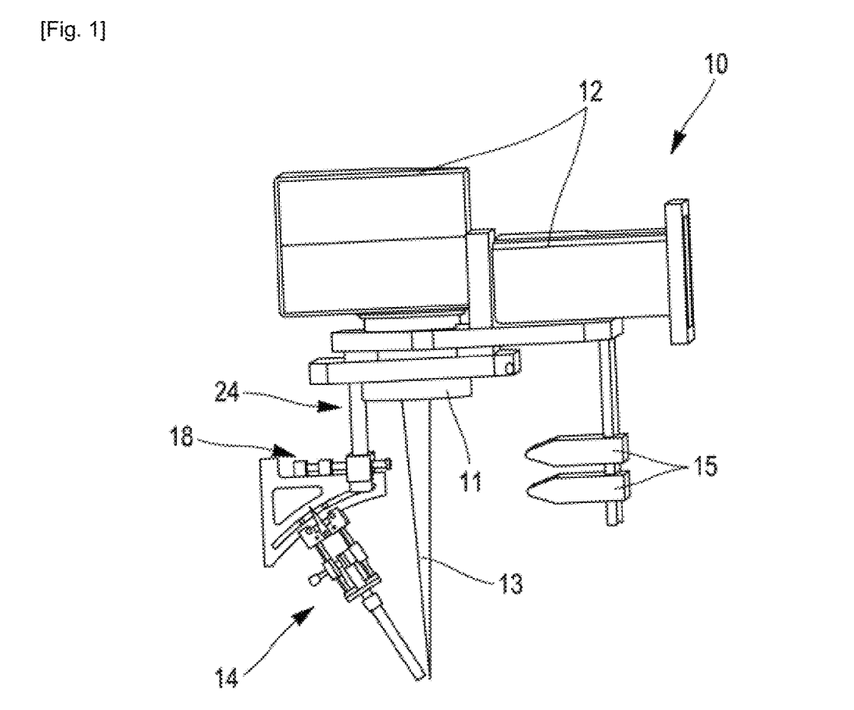
FIG. 1 shows a side view of the system according to the invention.

FIG. 1 shows a system 10 according to the invention. The system 10 comprises a focusing lens 11, a laser scanning head 12, a laser emission device (not shown) such as a fibre laser, a laser beam 13, a powder injection device 14 and a cross jet device 15 for protecting the focusing lens 11. The powder injection device 14 is supplied with metal powder by a powder feed device (not shown).

The laser beam used is derived from a multimode fibre laser source with a wavelength around 1 micrometre. The laser beam can also include other wavelengths. The laser source can also be single mode.

The relative motion between the laser beam and the part is produced within the system 10 using the laser scanning head 12 rather than polyarticulated axes of machines of prior art. This use of the laser scanning head 12 allows the use of a different and significantly faster laser beam trajectory and scanning speed than is generally achieved in the state of the art by the use of polyarticulated axes. The use of a lateral thin tube 16 allows the powder to be delivered close to surfaces of the part that are difficult to access in relation to the geometry of the part. The thin tube has an internal diameter in the order of a few millimetres, for example 8 mm.

Figure 2:
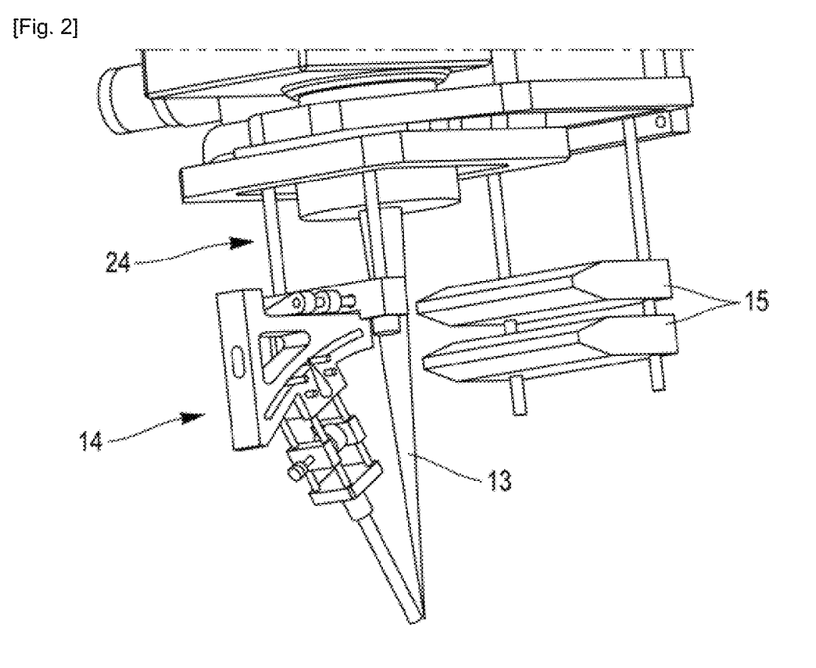
FIG. 2 shows a detailed perspective view of the system according to FIG. 1.

The laser scanning head 12 comprises at least two mirrors, known as galvanometric mirrors, for moving the focused laser beam at least in the plane of the surfaces to be resurfaced, repaired or constructed. Each mirror is rotatably driven about its axis by a motor called a galvanometric motor. The galvanometric motor comprises two electric coils, a permanent magnet to which a rotor that drives the corresponding galvanometric mirror is attached. When an electric current circulates through the electric coils, they act as electromagnets and generate a magnetic field. The permanent magnet then pivots to align itself with the magnetic field. Insofar as the permanent magnet is connected to the mirror via the rotor, the permanent magnet movably drives the mirror that also pivots. Control means allow the galvanometric to be controlled. The outlet of the scanning head 12 has a focusing system. Thus, from the emission of an incident laser beam (not shown), the laser scanning head is able to produce a reflected incident laser beam focused 13 shown in FIGS. 1, 2 and 3. For convenience, the reflected incident laser beam focused 13 is referred to as the laser beam 13 in the following of the description. The power of the laser beam is, for example, less than 1 kilowatt. The speed of movement of the laser beam 13 is, for example, greater than 50 metres per minute with a pitch of less than 200 micrometres. The diameter of the laser beam 13 is, for example, 1 millimetre.

The motion of the laser beam 13 provided by the laser scanning head 12 allows the temperature of the surface of the part to be treated by the method according to the invention to be raised and maintained, which allows the treatment of materials requiring pre-heating before addition of material or post-heating that is heating after addition of material according to the invention.

The laser scanning head allows the laser beam to be deflected at high speed and accurately.

Therefore, by virtue of the laser scanning head, the laser beam 13 can make trajectories or patterns of any shape thus avoiding the problems of acceleration, inertia and difficulty of access. The laser beam 13 therefore moves according to a specific pattern. Thus, the laser beam 13 can make spiral, square, circular, or "zig-zag" trajectories.

The system 10 comprises the powder injection device 14 laterally placed relative to the laser beam 13 when the latter is emitted. The powder injection device 14 comprises a thin tube 16 which allows powder material to be dispersed or dispensed as a cloud over the generally small surface area to be constructed, resurfaced or repaired, and generally difficult to access. The mass flow rate of the powder is less than 20 grams per minute for example. The thin tube 16 contains a carrier gas for transporting the powder from the powder feed device (not shown) to the outlet of the thin tube 16. The flow rate of the carrier gas is a few litres per minute, for example. By virtue of this flow rate, no protective gas is required to prevent oxidation of the powder as the carrier gas is sufficient and protects the molten bath and the powder from oxidation.

Figure 3:
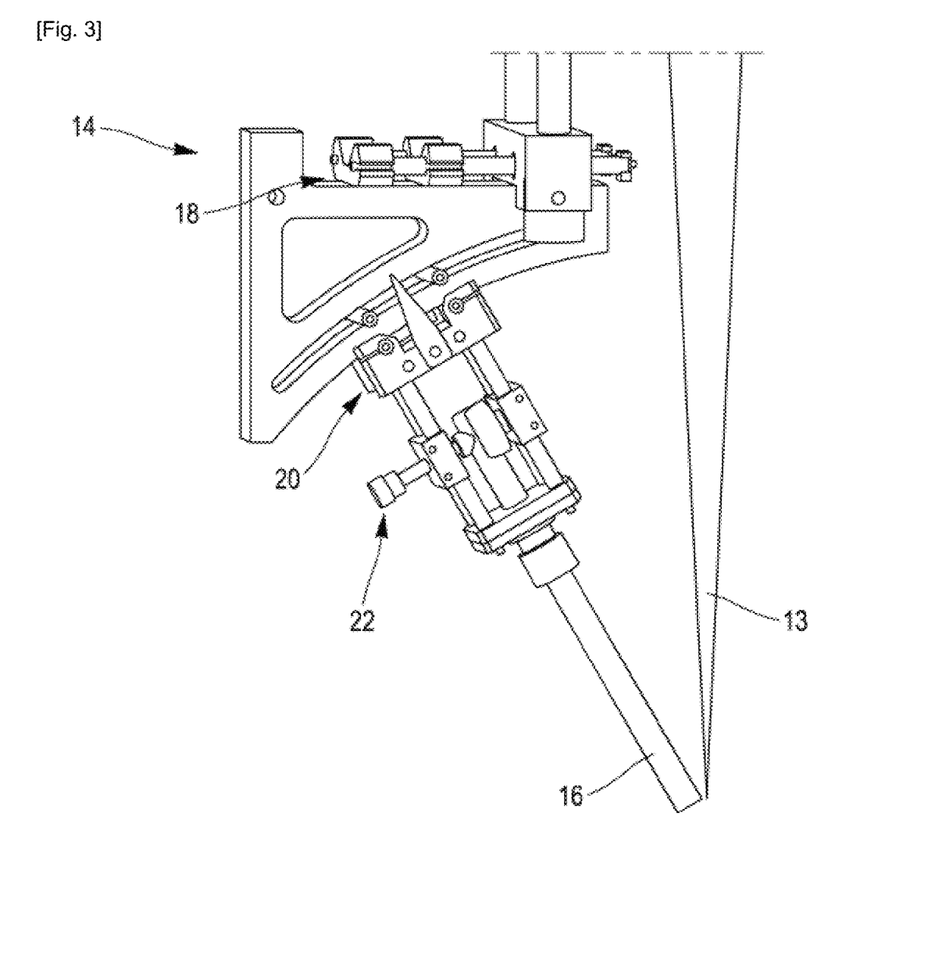
FIG. 3 shows a perspective view of the powder injection device according to the invention.

As shown in FIG. 3, the powder injection device 14 also comprises four motorisable adjustment devices 18, 20, 22 and 24. The first adjustment device 18 allows lateral adjustment of the thin tube 16 in a plane parallel to the surface of the part. The second adjustment device 20 allows angle at which the powder is dispersed on the surface of the part to be adjusted. The third adjustment device 22 allows height of the thin tube 16 to be adjusted relative to the surface of the part. The fourth adjustment device 24 allows height of the powder injection device 14 to be adjusted relative to the surface of the part.

The powder jet is fixed in relation to the surface to be repaired, resurfaced or constructed and covers the entire surface. The adjustment devices 18, 20, 22 and 24 allow angular and Cartesian adjustment relative to the surface of the part. For example, the angle of inclination of the thin tube 16 to the normal of the surface of the part is 25°. The distance of the thin tube 16 from the part is 15 millimetres. Thus, the powder injection device 14 allows the powder to be fed to zones of the part that are difficult to access. The powder injection device 14 can also work with non-metallic powders.

The system 10 according to the invention comprises the laser scanning head and the powder injection device 14 placed on a polyarticulated support (not shown) that is a support articulated along several axes to allow the system 10 to be positioned relative to the surface to be treated and to hold the system 10 stationary when depositing material on the surface to be treated.

The polyarticulated support thus makes it possible to move the system 10 to a determined position, above the part to be treated. During resurfacing, repair or construction, the system 10 is then stationary relative to the part.

Alternatively, the system 10 can be attached to a frame so as to be stationary. The polyarticulated support then allows the part to be moved to a determined position relative to the system 10.

The system 10 according to the invention also comprises a camera for locating the surface to be constructed, repaired or resurfaced and for positioning the system 10.

The system 10 according to the invention comprises an analysis device (not shown) capable of measuring the part to deduce therefrom the shape of the defect to be repaired, resurfaced or the surface of the part to be constructed, repaired or resurfaced. The analysis device comprises, for example, a probe, a three-dimensional scanner or a linear camera.

The system 10 according to the invention comprises an adaptive programming unit (not shown) to create trajectories or patterns adapted to the volume of material to be added.

The system 10 according to the invention comprises a temperature acquisition unit (not shown) or temperature sensor of the part to be constructed, repaired or resurfaced during pre-heating before addition of material and during post-heating after addition of material.

The system 10 according to the invention comprises a unit for automatically initiating (not shown) construction at the appropriate temperature, that is at a determined temperature.

The system 10 according to the invention comprises a unit for automatically managing (not shown) the complete cycle of addition of material (not shown).

The system 10 according to the invention comprises an information analysis unit (not shown) for monitoring addition of material.

The system 10 according to the invention comprises a unit for analysing geometry of the constructed volume and comparing it with a three-dimensional model (not shown).

The system 10 according to the invention comprises a unit for automatically managing arrival of powder (not shown).

The system 10 according to the invention comprises a unit for feedback controlling the emission power of the laser beam as a function of temperature (not shown).

Figure 4:
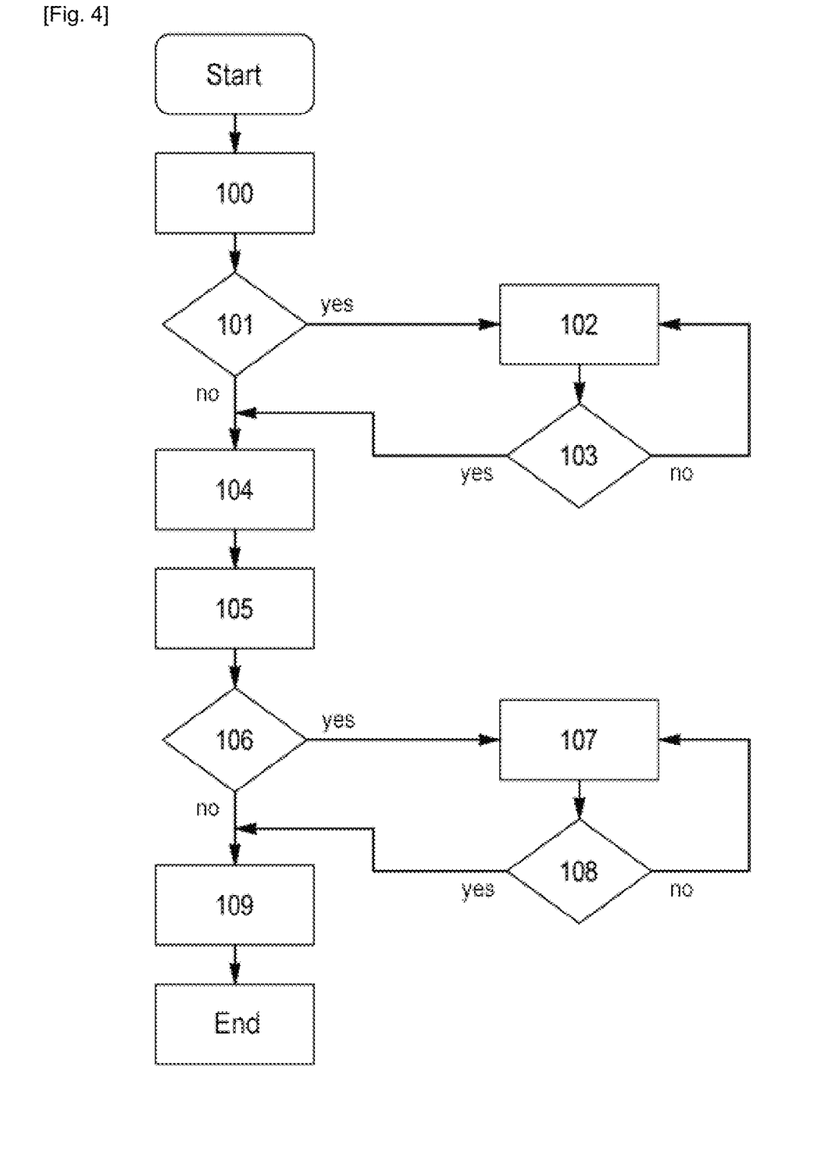
FIG. 4 shows a diagram of the steps of the method according to the invention.

In use, the system 10 according to the invention operates according to a method comprising the following steps shown in the diagram of FIG. 4.

In step 100, an identification of the defect, that is the determined surface, is carried out by the analysis device (not shown) and the system 10 aligns itself over the defect via the polyarticulated system relative to the surface to be repaired, resurfaced or constructed at determined distance and orientation.

This alignment can be manual or automatic. When the system 10 is aligned with the defect, the system 10 is ready to repair, resurface the defect or construct the volume.

In step 101, the user decides whether pre-heating of the determined surface is necessary, that is heating prior to the resurfacing, constructing or repairing step 105 described below.

If preheating is necessary, then the method continues with step 102 which comprises the emission of the laser beam 13 by means of which the laser scanning head 12 traces a predefined pattern on the determined surface of the part. This pattern, which may be different from the manufacturing pattern, makes it possible to raise the temperature on the zone to be resurfaced, repaired or constructed homogeneously and to allow deposition on a preheated material thus avoiding cracking.

In a step 103, the temperature sensor allows the temperature of the surface to be resurfaced, repaired or constructed to be monitored. As soon as the determined temperature set point is reached, the method proceeds to step 104.

In step 104, the powder injection device is activated to allow the powder to flow through the thin tube 16.

Then, in step 105, the laser emission device is activated. The laser beam then scans the predefined pattern. This pattern may be a pattern comprised of several layers, each layer potentially having its own pattern. The powder is molten by the laser beam 13 in a highly localised manner and the sequence of the pattern and layers makes it possible to make the shape to be deposited.

In step 106, the user decides whether post-heating of the determined surface is necessary. Post-heating is a step subsequent to step 105, during which the powder injection device 14 is deactivated and the laser beam 13 is emitted onto the determined surface identified in the predefined pattern.

If post-heating is necessary, then the method continues with step 107. In step 107, the powder injection device 14 is deactivated so that the powder stops flowing and the laser beam 13 scans the predefined pattern on the part.

In a step 108, the temperature sensor is used to monitor the temperature of post-heating to determine whether it is necessary to continue heating by adjusting parameters of the laser beam 13 to follow the cooling profile of the part or whether it is necessary to stop post-heating.

Then, in the optional step 109, the user visually checks or the system 10 automatically checks, using a probe, a three-dimensional scanner, a linear camera the geometry of the shape deposited on the determined surface in order to validate compliance of the geometry with a determined pattern.

According to a preferred embodiment, the speed of resurfacing, constructing or repairing is 13 metres per minute, the flow rate of the carrier gas is 3 litres per minute and the angle of inclination of the thin tube is 25 degrees to the normal of the surface of the part.

Figure 5:
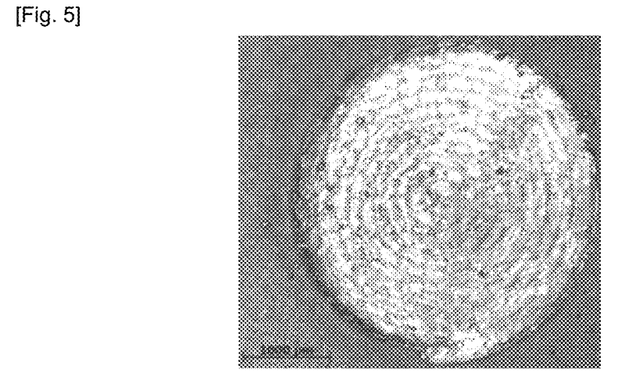
FIG. 5 shows a top view photograph of a repair with a spiral trajectory of the laser beam according to the invention.

FIG. 5 shows a top view photograph of a repair with a spiral trajectory of the laser beam.

Figure 6:
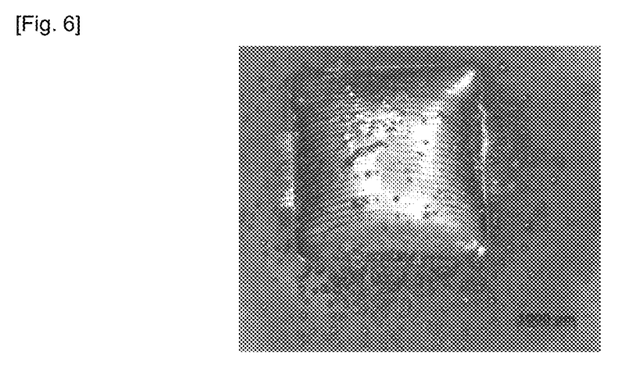
FIG. 6 shows a top view photograph of a repair with a zig-zag shaped trajectory of the laser beam on a square shaped part, according to the invention.

FIG. 6 shows a top view photograph of a repair with a zig-zag trajectory of the laser beam on a square-shaped part.

Figure 7:
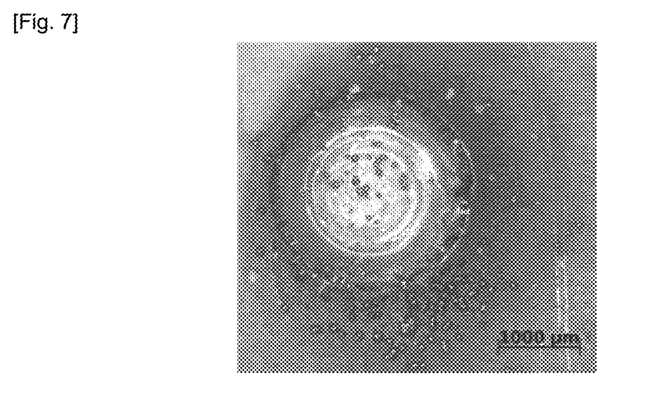
FIG. 7 shows another top view photograph of a repair with a spiral trajectory of the laser beam, according to the invention.

FIG. 7 shows a top view photograph of a repair with a spiral laser beam trajectory.

Figure 8:
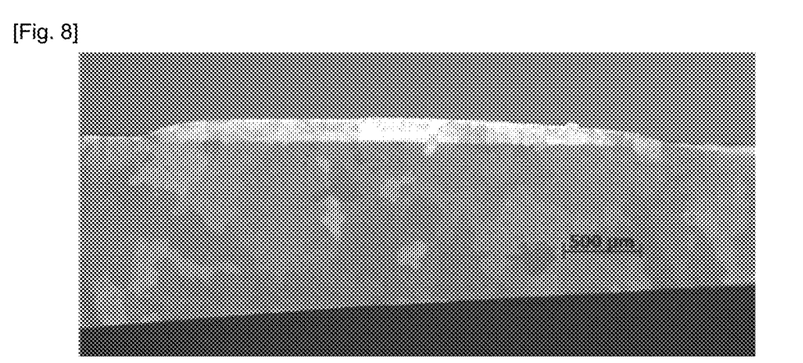
FIG. 8 shows a photograph of a repair after polishing and etching a transverse cross-section of the part treated, according to the invention.

FIG. 8 shows a photograph of a repair after polishing and etching a transverse cross-section of the part treated.

The system according to the invention allows the use of a laser scanning head 12 for a LMD (Laser Metal Deposition) method without a fixed powder bed, while keeping the system 10 stationary relative to the part to be treated. Within the invention, the powder jet is dynamic, namely it is present for the duration of the repair, resurfacing or construction. The pattern required for the construction of said volume is achieved solely by virtue of the motions of the galvanometric mirrors.

By virtue of the invention, the dynamics of movement, that is speed and acceleration of the laser beam in the plane of the part, are higher than in the repair, resurfacing and construction systems of prior art. Thus, the fast motion of the laser beam allows a more homogeneous thermal distribution of the treated surface.

By virtue of the invention, it is possible to achieve thermal management of a localised construction. Indeed, insofar as the powder feed and thermal energy feed are dissociated within the present invention, it is possible to pre-heat the surface to be constructed, repaired or resurfaced by means of the trajectory of the laser beam described above and to post-heat the surface constructed, repaired or resurfaced as described above.

This thermal management can therefore be carried out before and after constructing, repairing or resurfacing a determined surface.

At the end of the method according to the invention, the dilution rate is very low and equivalent to that of the laser resurfacing solutions of prior art.

The system according to the invention makes it possible to repair, resurface or construct parts with a small size, in the order of a few centimetres.

The system according to the invention also makes it possible to repair, resurface or construct surfaces of parts in zones of said parts that are currently inaccessible due to the overall size of a deposition nozzle according to prior art.

The system according to the invention also makes it possible to carry out repair, resurfacing or construction operations on materials likely to crack, according to the state of the art. By virtue of the system according to the invention, these materials do not crack after the method according to the invention. Indeed, the thermal management according to the invention makes it possible to avoid cracking.

The system according to the invention makes it possible to dissociate size of the material deposit on the part from the size of the laser beam by virtue of the movement dynamics of the laser beam.

Furthermore, the system according to the invention can be easily adapted to existing additive manufacturing machines.

The embodiments previously described are given as examples only.

BIBLIOGRAPHY

[1] Pekkarinen J. "Scanning optics enabled possibilities and challenges in laser cladding" Physics Procedia 78, (2015), pages 285-295.

The invention claimed is:

1. A system for adding material by melting powder on a determined surface of a part by means of a laser beam to construct a volume, the system comprising:
  a laser beam emitting device to emit an incident laser beam;
  a laser scanning head configured to direct the incident laser beam of the laser beam emitting device downwardly onto powder dispensed on the determined surface, the laser scanning head including:
    at least two galvanometric mirrors to reflect the incident laser beam such that the incident laser beam is a reflected incident laser beam and to move the incident laser beam at least in a plane of surfaces to be resurfaced, repaired, or constructed according to a determined pattern; and
    an outlet having a focusing system including a lens for focusing the reflected incident laser beam on the determined surface, the focusing system of the outlet of the laser scanning head transforming the reflected incident laser beam into a focused reflected incident laser beam that melts the powder dispensed on the determined surface, the focused reflected incident laser beam extending directly under at least a portion of the laser scanning head; and
  a powder injection device placed laterally relative to the focused reflected incident laser beam for dispensing powder onto the determined surface, the powder being continuously dispensed during construction of the volume, melting of the powder being carried out by the focused reflected incident laser beam emitted on the powder dispensed onto the determined surface.

2. The system according to claim 1 further comprising at least one polyarticulated support for moving the system or the part for positioning the system relative to the part in order to access the determined surface.

3. The system according to claim 1, wherein the powder injection device comprises a tube to dispense powder onto the determined surface.

4. The system according to claim 3, wherein the powder injection device comprises a first adjustment device for laterally adjusting the tube in a plane parallel to the determined surface of the part.

5. The system according to claim 1, wherein the powder injection device comprises a second adjustment device for adjusting an angle from which the powder is dispensed onto the determined surface.

6. The system according to claim 3, wherein the powder injection device comprises a third adjustment device for adjusting a height of the tube relative to the determined surface.

7. The system according to claim 1, wherein the powder injection device comprises a fourth adjustment device for adjusting a height of the powder injection device relative to the determined surface of the part.

8. The system according to claim 1, further comprising a lighting device to light the determined surface.

9. The system according to claim 1, further comprising a camera for locating the determined pattern and positioning the system.

10. The system according to claim 1, further comprising a device for analyzing the volume of material to be added, the device being a probe, a three-dimensional scanner or a camera.

11. The system according to claim 1, further comprising an adaptive programming unit to create trajectories adapted to the volume of material to be added.

12. The system according to claim 1, further comprising a unit for acquiring a temperature of the part during a pre-heating step before addition of material and during a post-heating step after addition of material.

13. The system according to claim 1, further comprising a unit for automatically initiating addition of material at a determined temperature.

14. The system according to claim 1, further comprising a unit for automatically managing a complete cycle of addition of material.

15. The system according to claim 1, further comprising an information analysis unit for monitoring addition of material.

16. The system according to claim 1, further comprising a unit for analyzing a geometry of the volume constructed and a unit for comparing the geometry of the volume constructed with a three-dimensional model.

17. The system according to claim 1, further comprising a unit for automatically managing an arrival of powder.

18. The system according to claim 1, further comprising a unit for feedback controlling emission power of the laser beam as a function of temperature.

19. A method for adding material to a determined surface of a part by means of a laser scanning head, a laser beam emission device, and a powder injection device to construct a volume from powder, the laser scanning head configured to direct an incident laser beam of the laser beam emission device downwardly onto powder dispensed on the determined surface, the laser scanning head including:

two galvanometric mirrors to reflect the incident laser beam such that the incident laser beam is a reflected incident laser beam and to move the reflected incident laser beam over the determined surface according to a determined pattern upon rotating the galvanometric mirrors and the laser scanning head, and the laser beam emission device; and an outlet having a focusing system including a lens for focusing the reflected incident laser beam on the determined surface, the focusing system of the outlet of the laser scanning head transforming the reflected incident laser beam into a focused reflected incident laser beam that melts the powder dispensed on the determined surface, the focused reflected incident laser beam extending directly under at least a portion of the laser scanning head, the method comprising the following steps:

determining a surface to be resurfaced, constructed or repaired on the part;

relatively positioning the laser scanning head, the laser beam emission device, and the powder injection device, or the part;

activating the powder injection device for flowing the powder onto the determined surface;

emitting, downwardly from the laser scanning head, the focused reflected incident laser beam, onto the determined surface according to the determined pattern, by the laser scanning head, the incident laser beam being reflected by the galvanometric mirrors and the reflected incident laser beam being focused by the lens of the focusing system;

moving the focused reflected incident laser beam according to the determined pattern upon rotating the galvanometric mirrors; and melting the powder on the determined surface, simultaneously when emitting the focused reflected incident laser beam.

20. The method according to claim 19, further comprising a pre-heating step, in which the incident reflected laser beam is emitted onto the determined surface identified according to the determined pattern or another predefined pattern, the pre-heating step taking place before activating the powder injection device.

21. The method according to claim 19, further comprising a post-heating step, the post-heating step taking place after a step of deactivating the powder injection device.

22. A system for adding material by melting powder on a determined surface of a part by means of a laser beam to construct a volume, the system comprising:

a laser beam emitting device to emit an incident laser beam;

a laser scanning head configured to direct the incident laser beam of the laser beam emitting device downwardly onto powder dispensed on the determined surface, the laser scanning head including:

at least two galvanometric mirrors to reflect the incident laser beam such that the incident laser beam is a reflected incident laser beam and to move the incident laser beam at least in a plane of surfaces to be resurfaced, repaired, or constructed according to a determined pattern; and an outlet having a focusing system including a lens for focusing the reflected incident laser beam on the determined surface, the focusing system of the outlet of the laser scanning head transforming the reflected incident laser beam into a focused reflected incident laser beam that melts the powder dispensed on the determined surface, the focused reflected incident laser beam extending directly under at least a portion of the laser scanning head, wherein the laser scanning head is stationary relative to the part during construction of the volume; and a powder injection device placed laterally relative to the focused reflected incident laser beam for dispensing powder onto the determined surface, the powder being continuously dispensed during construction of the volume, melting of the powder being carried out by the focused reflected incident laser beam emitted on the powder dispensed onto the determined surface.

\* \* \* \* \*